United States Patent
Wu et al.

(10) Patent No.: US 11,498,705 B1
(45) Date of Patent: Nov. 15, 2022

(54) ON ORBIT FLUID PROPELLANT DISPENSING SYSTEMS AND METHODS

(71) Applicant: Ball Aerospace & Technologies Corp., Boulder, CO (US)

(72) Inventors: Gordon C. Wu, Lafayette, CO (US); Derek Chan, Boulder, CO (US); Suzan Q. Green, Longmont, CO (US)

(73) Assignee: Ball Aerospace & Technology Corp., Boulder, CO (US)

( * ) Notice: Subject to any disclaimer, the term of this patent is extended or adjusted under 35 U.S.C. 154(b) by 75 days.

(21) Appl. No.: 16/871,144

(22) Filed: May 11, 2020

Related U.S. Application Data

(60) Provisional application No. 62/845,547, filed on May 9, 2019.

(51) Int. Cl.

| | | |
|---|---|---|
| *B64G 1/40* | (2006.01) | |
| *F02K 9/50* | (2006.01) | |
| *F02K 9/58* | (2006.01) | |
| *F02K 9/44* | (2006.01) | |
| *B64G 5/00* | (2006.01) | |
| *F02K 9/60* | (2006.01) | |

(52) U.S. Cl.
CPC ............. *B64G 1/402* (2013.01); *B64G 5/00* (2013.01); *F02K 9/44* (2013.01); *F02K 9/50* (2013.01); *F02K 9/58* (2013.01); *F02K 9/605* (2013.01)

(58) Field of Classification Search
CPC ... F02K 9/42; F02K 9/445; F02K 9/56; F02K 9/566; F02K 9/58; F02K 9/88; B64G 1/244; B64G 1/26; B64G 1/402; B64G 1/566; B64G 5/00
See application file for complete search history.

(56) References Cited

U.S. PATENT DOCUMENTS

| | | |
|---|---|---|
| 3,350,886 A | 11/1967 | Feraud et al. |
| 4,609,169 A | 9/1986 | Schweickert et al. |
| 4,880,185 A | 11/1989 | Apfel |
| 5,026,259 A | 6/1991 | Whitehead et al. |

(Continued)

FOREIGN PATENT DOCUMENTS

| | | |
|---|---|---|
| EP | 2530018 | 7/2014 |
| EP | 3689758 | 3/2021 |

OTHER PUBLICATIONS

Devereaux, Andrew, Development Testing of a New Bipropellant Propulsion System for the GMP-T Spacecraft, Jul. 2010, AIAA, 2010-6649 (Year: 2010).*

(Continued)

*Primary Examiner* — William H Rodriguez
*Assistant Examiner* — Kyle Robert Thomas
(74) *Attorney, Agent, or Firm* — Sheridan Ross P.C.

(57) ABSTRACT

Systems and methods for refueling a chemical propulsion system are provided. The systems can include multiple pressurant reservoirs to supply pressure to one or more fuel tanks. During a refueling operation, pressurant is released, fuel is added to the fuel tank, and then the fuel tank is repressurized using pressurant from a secondary pressurant tank. In other configurations, during a refueling operation pressurant is cooled to depressurize the fuel tank, fuel is added to the fuel tank, and then the pressurant is heated to repressurize the fuel tank. The systems and methods can be used to refuel operationally deployed space craft.

13 Claims, 5 Drawing Sheets

(56) References Cited

U.S. PATENT DOCUMENTS

| | | | |
|---|---|---|---|
| 5,305,970 A * | 4/1994 | Porter | B64G 1/12 244/135 R |
| 5,823,478 A | 10/1998 | Dunn | |
| 5,927,653 A | 7/1999 | Mueller et al. | |
| 5,961,074 A | 10/1999 | Dunn | |
| 6,119,985 A | 9/2000 | Clapp et al. | |
| 6,299,107 B1 | 10/2001 | Kong et al. | |
| 6,314,978 B1 * | 11/2001 | Lanning | B64G 1/402 137/256 |
| 6,457,306 B1 | 10/2002 | Abel et al. | |
| 6,971,228 B2 | 12/2005 | Dujarric | |
| 7,762,498 B1 | 7/2010 | Henderson et al. | |
| 8,074,935 B2 | 12/2011 | Gryniewski et al. | |
| 8,181,911 B1 | 5/2012 | Gryniewski et al. | |
| 8,393,582 B1 | 3/2013 | Kutter et al. | |
| 8,899,527 B2 | 12/2014 | Allen et al. | |
| 9,108,747 B2 | 8/2015 | Roberts et al. | |
| 9,145,216 B2 | 9/2015 | Gascon et al. | |
| 9,249,758 B2 | 2/2016 | Conrardy | |
| 9,260,206 B2 | 2/2016 | Allen et al. | |
| 9,446,862 B2 | 9/2016 | Barthoulot et al. | |
| 9,567,111 B2 | 2/2017 | Roberts et al. | |
| 9,676,499 B2 | 6/2017 | Myers et al. | |
| 9,688,422 B2 | 6/2017 | Roberts et al. | |
| 10,589,879 B2 | 3/2020 | Baldwin et al. | |
| 10,604,281 B2 | 3/2020 | Raven et al. | |
| 10,738,739 B2 | 8/2020 | Bahn | |
| 10,844,808 B2 | 11/2020 | Bahn et al. | |
| 10,926,892 B1 | 2/2021 | Wu et al. | |
| 10,926,982 B2 | 2/2021 | Lindberg | |
| 11,021,273 B1 | 6/2021 | Wu et al. | |
| 11,059,608 B2 | 7/2021 | Holder et al. | |
| 2002/0139902 A1 | 10/2002 | Valentian | |
| 2002/0179776 A1 | 12/2002 | Mueller et al. | |
| 2003/0075645 A1 | 4/2003 | Randolph et al. | |
| 2003/0131583 A1 | 7/2003 | Kudija, Jr. et al. | |
| 2003/0173469 A1 | 9/2003 | Kudija, Jr. et al. | |
| 2003/0209005 A1 | 11/2003 | Fenn | |
| 2004/0031885 A1 | 2/2004 | D'Ausilio et al. | |
| 2004/0035982 A1 | 2/2004 | Capozzi et al. | |
| 2004/0061028 A1 | 4/2004 | Salvatore et al. | |
| 2004/0226279 A1 | 11/2004 | Fenn | |
| 2004/0245406 A1 | 12/2004 | Guiheen et al. | |
| 2004/0245407 A1 | 12/2004 | D'Ausilio et al. | |
| 2005/0034447 A1 | 2/2005 | Joshi et al. | |
| 2005/0151022 A1 | 7/2005 | D'Ausilio et al. | |
| 2005/0205717 A1 | 9/2005 | Salvatore et al. | |
| 2007/0040067 A1 | 2/2007 | D'Ausilio et al. | |
| 2007/0108349 A1 | 5/2007 | D'Ausilio et al. | |
| 2007/0114334 A1 | 5/2007 | D'Ausilio et al. | |
| 2007/0153960 A1 | 7/2007 | D'Ausilio et al. | |
| 2007/0153961 A1 | 7/2007 | D'Ausilio et al. | |
| 2007/0153962 A1 | 7/2007 | D'Ausilio et al. | |
| 2008/0011903 A1 | 1/2008 | D'Ausilio et al. | |
| 2008/0027595 A1 | 1/2008 | Fowler et al. | |
| 2008/0029651 A1 | 2/2008 | D'Ausilio et al. | |
| 2008/0142639 A1 | 6/2008 | Jallade | |
| 2008/0256924 A1 | 10/2008 | Pederson et al. | |
| 2008/0265098 A1 * | 10/2008 | Connelly | B64G 1/007 244/171.1 |
| 2008/0296436 A1 | 12/2008 | D'Ausilio et al. | |
| 2009/0020650 A1 | 1/2009 | Ho | |
| 2009/0078829 A1 | 3/2009 | Ho et al. | |
| 2009/0242704 A1 | 10/2009 | D'Ausilio et al. | |
| 2009/0299553 A1 | 12/2009 | Hope | |
| 2009/0313967 A1 | 12/2009 | Joshi et al. | |
| 2009/0320974 A1 | 12/2009 | Joshi et al. | |
| 2010/0180443 A1 | 7/2010 | Joshi et al. | |
| 2011/0144835 A1 | 6/2011 | Ho | |
| 2011/0180670 A1 | 7/2011 | D'Ausilio et al. | |
| 2012/0241355 A1 | 9/2012 | Tuttle et al. | |
| 2012/0241459 A1 | 9/2012 | Tuttle | |
| 2012/0325972 A1 | 12/2012 | Gryniewski et al. | |
| 2013/0313370 A1 | 11/2013 | Rakers | |
| 2014/0032092 A1 | 1/2014 | Vu | |
| 2014/0365043 A1 | 12/2014 | Vu | |
| 2015/0021439 A1 | 1/2015 | Duchemin et al. | |
| 2016/0200457 A1 | 7/2016 | Droppers | |
| 2016/0273524 A1 | 9/2016 | Keidar et al. | |
| 2016/0333826 A1 | 11/2016 | Tsay et al. | |
| 2016/0368624 A1 | 12/2016 | Hruby et al. | |
| 2017/0283095 A1 | 10/2017 | Koehler et al. | |
| 2017/0284339 A1 | 10/2017 | Koehler et al. | |
| 2017/0361951 A1 | 12/2017 | Walker | |
| 2017/0363044 A1 | 12/2017 | Rhodes | |
| 2017/0370353 A1 | 12/2017 | Keidar et al. | |
| 2018/0148197 A1 | 5/2018 | Halsband et al. | |
| 2018/0186476 A1 | 7/2018 | Poncet et al. | |
| 2018/0327118 A1 | 11/2018 | Ganapathy et al. | |
| 2018/0370659 A1 | 12/2018 | Keidar et al. | |
| 2019/0077523 A1 | 3/2019 | Faber | |
| 2019/0144140 A1 | 5/2019 | Hosoda et al. | |
| 2019/0168606 A1 | 6/2019 | Faber et al. | |
| 2020/0003159 A1 | 1/2020 | Karp et al. | |
| 2020/0024003 A1 | 1/2020 | Koehler et al. | |
| 2020/0283174 A1 | 9/2020 | Kokorich et al. | |
| 2020/0407084 A1 | 12/2020 | Shashurin et al. | |

OTHER PUBLICATIONS

Gorin, Barney, Next Generation Fill and Drain/Vent Valve, Jul. 2005, AIAA, 2005-3731 (Year: 2005).*

"Control valves," Wikipedia, Nov. 18, 2009, 2 pages.

CHATO "Technologies for Refueling Spacecraft On-Orbit," NASA, Nov. 2000, NASA/TM-2000-210476, 14 pages.

\* cited by examiner

ON ORBIT FLUID PROPELLANT DISPENSING SYSTEMS AND METHODS

CROSS-REFERENCE TO RELATED APPLICATIONS

This application claims the benefit of U.S. Provisional Patent Application Ser. No. 62/845,547, filed May 9, 2019, the entire disclosure of which is hereby incorporated herein by reference.

FIELD

Systems and methods for refueling chemical propellant systems are provided.

BACKGROUND

Spacecraft and satellites (hereinafter referred to collectively as spacecraft) often incorporate thrusters for propulsion and attitude control. Thrusters can include chemical propulsion systems that operate by combusting a chemical propellant in a combustion chamber to produce an exhaust gas that is ejected through a nozzle, thereby creating thrust in a desired direction. Liquid propellants are typically dispensed using a pressurized gas, such as helium or nitrogen.

An ability to refuel spacecraft while in orbit or while otherwise operational is desirable in order to prolong the useful life of the spacecraft. One approach is to force propellant into the spacecraft against the pressure supplied by the pressurant. However, this takes significant time, is difficult, and requires relatively complex servicer spacecraft designs. Alternatively, pressure in the system can be reduced by venting the pressurant. However, this results in loss of the pressurant, and thus requires refueling of the pressurant in addition to the propellant.

SUMMARY

Embodiments of the present disclosure provide for chemical propellant systems that allow chemical propellant thruster systems to be refueled without requiring operation at high pressures, and without requiring resupplying the system with pressurant. In particular, embodiments of the present disclosure provide an ability to re-pressurize the propellant tank or tanks after the pressure within those tanks has been decreased to facilitate or to allow for refueling of the propellant tank. In accordance with further embodiments of the present disclosure, the pressurant can be reused to dispense multiple tanks of propellant. In such embodiments, the pressurant can be condensed to lower the pressure within the propellant management system during refueling, and then heated for dispensing the propellant once refueling is complete.

Systems in accordance with embodiments of the present disclosure can feature one or more secondary pressurant tanks, in addition to a primary pressurant tank. As a result of this, the need to replenish the pressurant after the propellant tank is refueled is reduced or eliminated. In accordance with still other embodiments, the system can include multiple propellant tanks, and can support the ability to shift propellant between tanks for load balancing. Moreover, embodiments of the present disclosure can be implemented in connection with monopropellant or bipropellant propulsion systems.

Additional features and advantages of embodiments of the disclosed systems and methods will become more readily apparent from the following description, particularly when taken together with the accompanying drawings.

DETAILED DESCRIPTION

Figure 1:
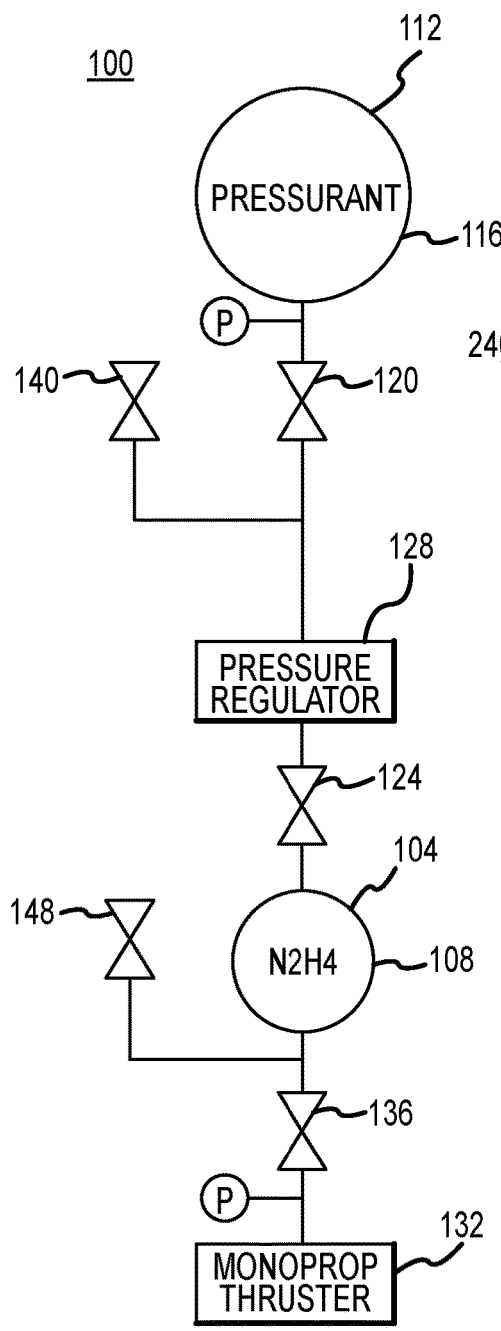
FIG. 1 is a block diagram depicting a conventional monopropellant thruster system.

An example of a chemical propellant thruster system 100 is illustrated in FIG. 1. In this example system 100, the chemical propellant 104 is hydrazine ($N_2H_4$) contained within a fuel tank 108. The chemical propellant 104 is pressurized by a pressurant 112, which is stored in a pressurant tank or chamber 116 connected to the fuel tank 108 via a pressurant tank valve 120, a pressure regulator 128, and a pressurant supply valve 124. The chemical propellant 104 is selectively passed to a propellant thruster 132 via a propellant valve 136. A pressurant tank fill/drain valve 140 and a propellant fill/drain valve 148 can also be included in the system 100. By selectively operating the various valves, refueling by adding propellant 104 to the fuel tank 108, either against the pressure introduced by the pressurant 112, or at a reduced pressure after venting some amount of pressurant 112, can be accomplished. However, forcing propellant 104 into the system 100 against the pressure of the pressurant 112 is difficult, while venting the pressurant 112 can result in a need to refill the pressurant tank 116.

Figure 2:
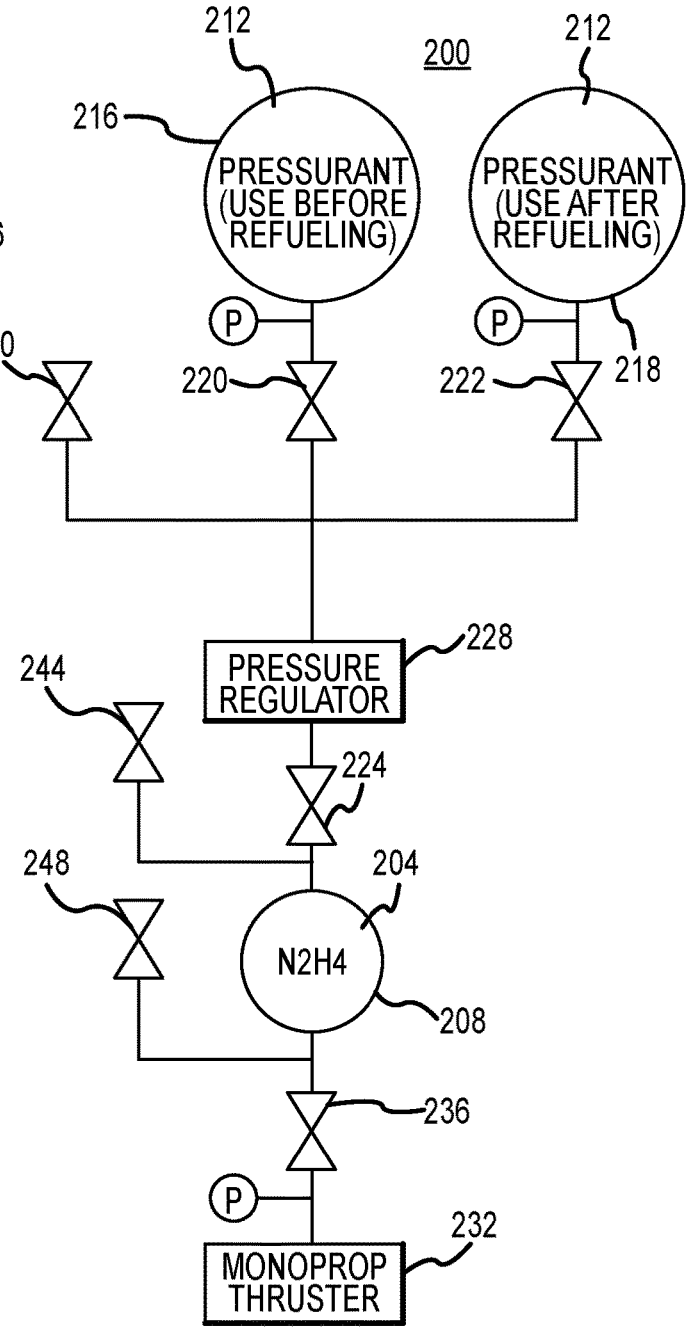
FIG. 2 is a block diagram depicting a chemical propellant thruster system in accordance with embodiments of the present disclosure.

With reference now to FIG. 2, a chemical propellant thruster or propulsion system 200 in accordance with embodiments of the present disclosure is depicted. In this example a chemical propellant 204, such as but not limited to hydrazine, is contained within a fuel tank 208. The chemical propellant 204 is pressurized by a pressurant 212. A primary pressurant tank or chamber 216 stores a first portion of the pressurant 212, while a secondary pressurant tank 218 stores a second portion of the pressurant 212. The primary pressurant tank 216 is selectively connected to the fuel tank 208 by a primary pressurant tank valve 220 and a pressurant supply valve 224. The secondary pressurant tank 218 is selectively connected to the fuel tank 208 by a secondary pressurant tank valve 222 and the pressurant supply valve 224. A pressure regulator 228 can be provided upstream of the fuel tank 208, for example between the pressurant supply valve 224 and the pressurant tank valves 220 and 222. In a typical first operational configuration, the chemical propellant 204 in the fuel tank 208 is pressurized by opening the primary pressurant tank valve 220 and the pressurant supply valve 224, while the secondary pressurant tank valve 222 is closed. In addition, in a second operational configuration, the chemical propellant 204 in the fuel tank 208 is pressurized by opening the secondary pressurant tank valve 222 and the pressurant supply valve 224, while the primary pressurant tank valve 220 is closed. The fuel tank 208 containing the chemical propellant 204 is selectively in communication with a thruster 232 via a propellant valve 236.

A pressurant tank fill/drain valve 240, a pressurant supply fill/drain valve 244, and a propellant fill/drain valve 248 are also included in the system 200. The pressurant tank fill/drain valve 240 and/or the pressurant supply fill/drain valve 244 can allow pressurant 212 to be vented to a surrounding atmosphere when opened. The pressurant tank fill/drain valve 240 and/or the pressurant supply fill/drain valve 244 can also be connected to a pressurant 212 resupply source. The propellant fill/drain valve 248 generally includes or can be associated with a refueling port, to allow fuel to be received by the system 200 during a refueling operation. By selectively operating the various valves, refueling by adding propellant 204 to the fuel tank 208 can be performed while the fuel tank 208 is depressurized and isolated from the pressurant tanks 216 and 218. For example, in a refueling operation, the pressurant 212 in the pressurant tanks 216 and 218 can be isolated from the fuel tank 208 by closing the pressurant tank valves 220 and 222, and/or by closing the pressurant supply valve 224. With the pressurant tanks 216 and 218 isolated from the fuel tank 208, any pressurant in the fuel tank 208 can be released by opening the pressurant supply fill/drain valve 244, thereby depressurizing the fuel tank 208. With the fuel tank 208 depressurized, and preferably with the pressurant supply valve 224, the pressurant supply fill/drain valve 244, and the propellant valve 236 all closed, the propellant fill/drain valve 248 can be opened, and fuel 204 can be added through the open propellant fill/drain valve 248. The refueling can be completed by closing the propellant fill/drain valve 248 and then re-pressurizing the fuel tank 208 and the fuel 204 contained therein by opening the pressurant supply valve 224 and the one of the pressurant tank valves 220 and 222, thereby placing a corresponding one of the pressurant tanks 216 or 218 in communication with the fuel tank 208.

Figure 3:
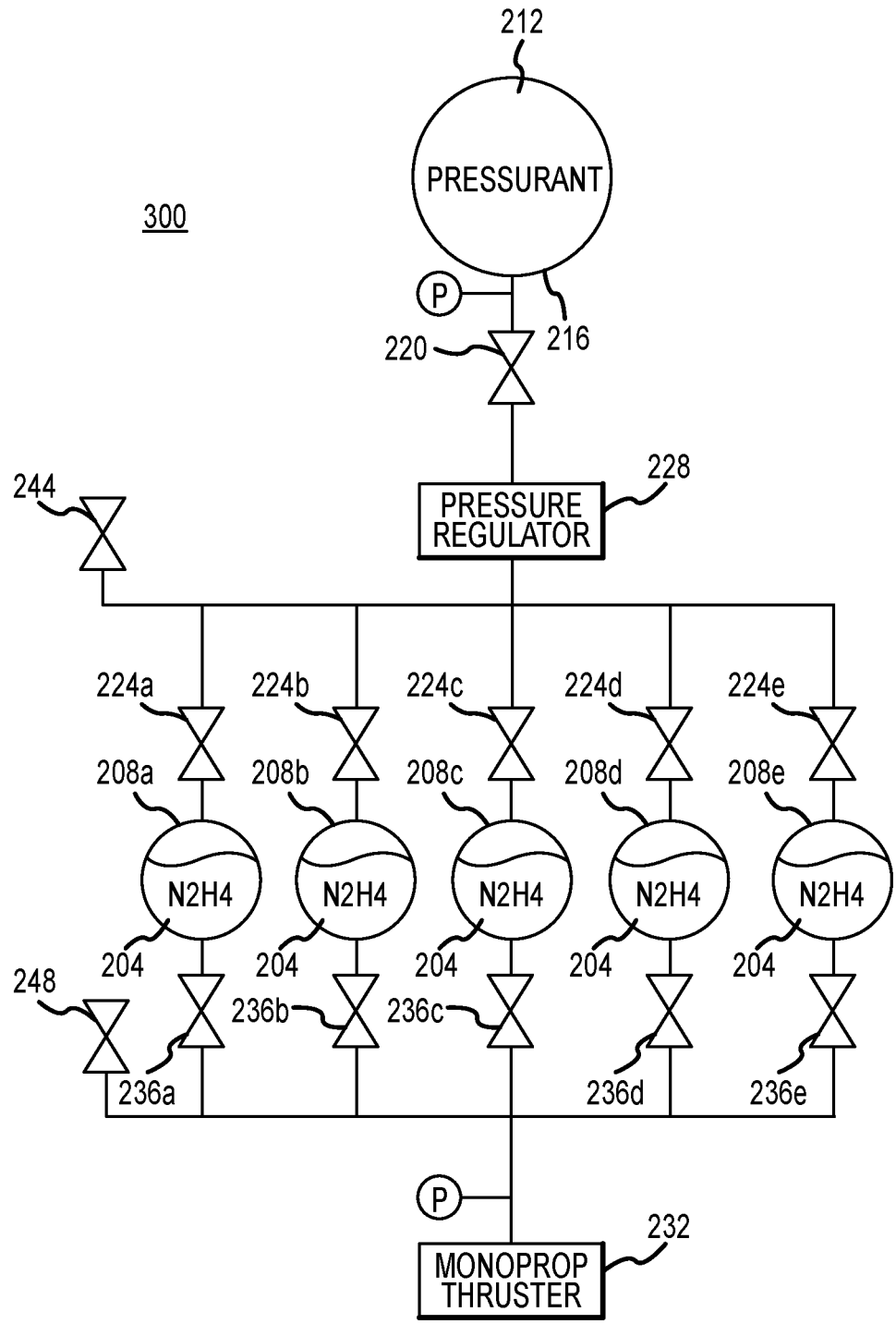
FIG. 3 is a block diagram depicting a chemical propellant thruster system in accordance with other embodiments of the present disclosure.

FIG. 3 is a block diagram depicting a chemical propellant thruster system 300 in accordance with other embodiments of the present disclosure. In this system 300, multiple fuel tanks 208a-208e that each contain a chemical propellant 204 are included. In the figure, the fuel tanks are all depicted as containing the same chemical, in particular hydrazine, providing a monopropellant type system. However, other configurations are possible. In particular, some of the fuel tanks 208 can be filled with a chemical propellant (e.g. hydrazine) and other of the fuel tanks 208 can be filled with an oxidizer (e.g. nitrogen tetroxide), providing a bipropellant type system, in which case the thruster 232 is a bipropellant thruster. The fuel tanks 208a-208e are each associated with a pressurant supply valve 224a-224e and a propellant valve 236a-236e respectively. In addition, a pressurant valve 220, a pressurant supply fill/drain valve 244, and a propellant fill/drain valve 248 are provided. The pressurant supply fill/drain valve 244 can allow pressurant 212 to be vented to the surrounding atmosphere when opened. The pressurant supply fill/drain valve 244 can also be connected to a pressurant 212 resupply source. The propellant fill/drain valve 248 generally includes or can be associated with a refueling port, to allow fuel to be received by the system 200 during a refueling operation. As can be appreciated by one of skill in the art after consideration of the present disclosure, in a bipropellant type system an additional fill/drain valve 248 is provided for the oxidizer. In the example system 300, the pressurant supply fill/drain valve 244 is located in a section of conduit connecting the pressurant supply valves 224 to the pressurant valve 220. Also in this example, the propellant fill/drain valve 248 is located in a section of conduit connecting the propellant valves 236 to the thruster 232. The propellant 204 can be selectively pressurized using a pressurant 212 stored in a pressurant tank 216 by selectively opening a pressurant tank valve 220 and one or more of the pressurant supply valves 224a-224e. In this embodiment, the inclusion of multiple fuel tanks 208 enables propellant 204 to be shifted between the fuel tanks 208, thereby providing control of the center of mass of an associated spacecraft. Moreover, the control over the center of mass can be used to minimize the center of pressure to center of mass offset, for instance to minimize accumulated solar pressure torque.

By selectively operating the various valves, refueling by adding propellant 204 to one or more of the fuel tanks 208 can be performed while the fuel tanks 208 are depressurized and isolated from the pressurant tank 216. For example, in a refueling operation, the pressurant 212 in the pressurant tank 216 can be isolated from the fuel tanks 208 by closing the pressurant tank valve 220 valve. With the pressurant tank 216 isolated from the fuel tanks 208a-e, any pressurant in any one or more of the fuel tanks 208a-e can be released by opening the pressurant supply fill/drain valve 244 and the pressurant supply valve 224a-e corresponding to the one or more fuel tanks 208, thereby depressurizing those fuel tanks 208. The depressurized fuel tank or tanks 208 can then be refueled by closing the pressurant supply valve or valves 224, opening the propellant valve or valves 236 associated with the fuel tanks 208 to be refueled, opening the propellant fill/drain valve 248, and adding fuel 204 through the open propellant fill/drain valve 248 and the open propellant valve or valves 236. The refueling can be completed by closing the propellant fill/drain valve 248, opening the pressurant supply valves 224, and then re-pressurizing the fuel tanks 208 and the fuel 204 contained therein by opening the pressurant supply valves 224 and the pressurant tank valve 220. The propellant valves 236 can be open or closed during the repressurization, as valves included in the thruster 232 will prevent pressurized fuel 204 being expelled from the system.

Figure 4:
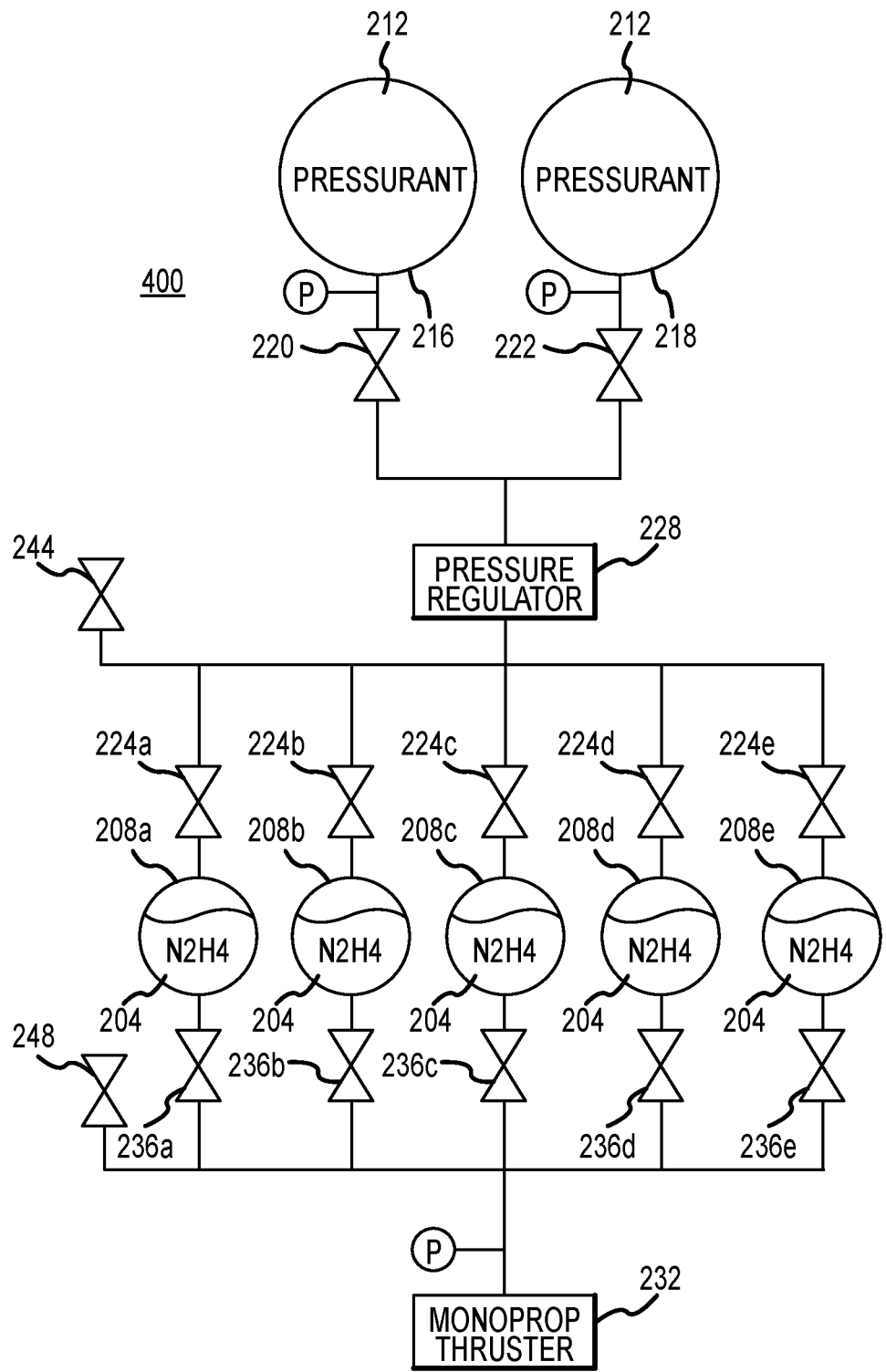
FIG. 4 is a block diagram depicting a chemical propellant thruster system in accordance with other embodiments of the present disclosure.

FIG. 4 is a block diagram depicting a chemical propellant thruster system 400 in accordance with further embodiments of the present disclosure. More particularly, the system 400 includes multiple fuel tanks 208a-208e and multiple pressurant tanks 216 and 218. As in the example system 300, the system 400 is depicted as a monopropellant type system. However, it can also be implemented as a bipropellant type system by providing some fuel tanks 208 with a propellant and other fuel tanks with an oxidizer, and by providing a thruster 232 in the form of a bipropellant thruster. Pressurant 212 for pressurizing fuel 204 in the fuel tanks 208 is supplied by either a primary pressurant tank 216 or a secondary pressurant tank 218. Each fuel tank 208 is associated with a pressurant supply valve 224 (labeled 224a-224e in the figure) and a propellant valve 236. The primary pressurant tank 216 is selectively connected to the fuel tanks 208 through a primary pressurant tank valve 220 and the pressurant supply valve 224 associated with one or more of the fuel tanks 208. The secondary pressurant tank 218 is selectively connected to the fuel tanks 208 through a secondary pressurant tank valve 222 and the pressurant supply valve associated with one or more of the fuel tank 208. A pressure regulator 228 can be provided between the pressurant tank valves 220 and 222 and the pressurant supply valves 224. In addition, a pressurant supply fill/drain valve 244, and a propellant fill/drain valve 248 are provided. The pressurant supply fill/drain valve 244 can allow pressurant 212 to be vented to the surrounding atmosphere when opened. The pressurant supply fill/drain valve 244 can also be connected to a pressurant 212 resupply source. The propellant fill/drain valve 248 generally includes or can be associated with a refueling port, to allow fuel to be received by the system 200 during a refueling operation. Where the system 400 is configured as a bipropellant type system, an additional fill/drain valve 248 is provided for the oxidizer.

The configuration of the system 400 allows propellant 204 to be added to one or more fuel tanks 208 while the fuel tanks 208 are depressurized. In addition, pressurant 212 for repressurizing the fuel tanks 208 can be supplied from either or both of primary 216 and secondary 218 pressurant tanks. In particular, selected fuel tanks 208 can be depressurized by releasing pressurant 212 from the fuel tanks 208 through the pressurant supply valve 224 associated with the selected fuel tanks 208 and the pressurant supply fill/drain valve 244. Fuel 204 can then be added through the propellant fill/drain valve 248 and the propellant valve 236 associated with the depressurized fuel tanks 208. After refueling is complete, and with the pressurant supply fill/drain valve 244, the propellant valves 236 and the propellant fill/drain valve 248 closed, the propellant 204 in the fuel tanks 208 can be repressurized by opening one of the pressurant tank valves 220 or 222 and selected pressurant supply valves 224. Accordingly, pressurant 212 can be selectively provided to the fuel tanks 208 from one or all of multiple pressurant tanks 216 and 218. In addition, this configuration allows propellant 204 to be shifted between fuel tanks 208 for load balancing purposes and the like.

Figure 5:
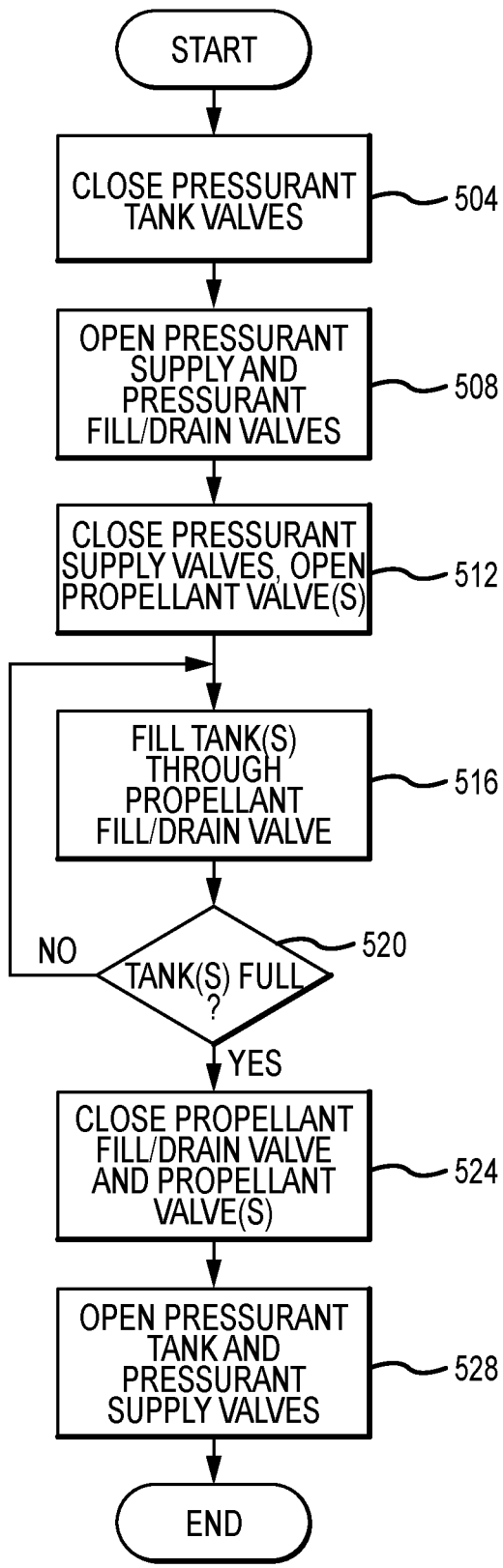
FIG. 5 is a flowchart depicting aspects of a process for refueling a chemical propellant thruster system in accordance with embodiments of the present disclosure.

FIG. 5 is a flowchart depicting aspects of a process for refueling a chemical propellant thruster system, for example a system 400 having multiple pressurant tanks 216 and 218 and multiple fuel tanks 208, in accordance with embodiments of the present disclosure. The process can also be applied to systems having different combinations of components, for example systems 200 and 300, with modifications to account for those different components. Initially, at step 504, the pressurant tank valves 220 and 222 are closed. The pressurant supply valves 224 for fuel tanks 208 that are to be refueled and the pressurant supply fill/drain valve 244 are then opened, to release pressurant 212, thereby depressurizing the fuel tank or tanks 208 (step 508). Next, the pressurant supply valves 224 and the pressurant supply fill/drain valve 244 are closed, and the propellant valves 236 of the fuel tanks 208 to be refueled and the propellant fill/drain valve 248 are opened (step 512). The depressurized fuel tank or tanks 208 are then filled through the propellant fill/drain valve 248 (step 516). As an example, but without limitation, the fuel 204 can be provided by a servicer spacecraft. At step 520, a determination is made as to whether the fuel tank or tanks 208 are full. If no, the process returns to step 516. If yes, the propellant fill/drain valve 248 and the open propellant valves 236 are closed (step 524). As can be appreciated by one of skill in the art after consideration of the present disclosure, the refueling process can be repeated for different chemical compounds stored in different fuel tanks 208, for example for bipropellant type systems. The refueled fuel tanks 208 are then repressurized by opening one of the pressurant tank valves 220 or 222 and the pressurant supply valve or valves 224 for the fuel tank or tanks 208 to be repressurized (step 528). In accordance with embodiments of the present disclosure, pressurant 212 for repressurizing the fuel tanks 208 can be supplied from the secondary pressurant tank 218 after the primary pressurant tank 216 has been depleted. The process can then end.

Figure 6:
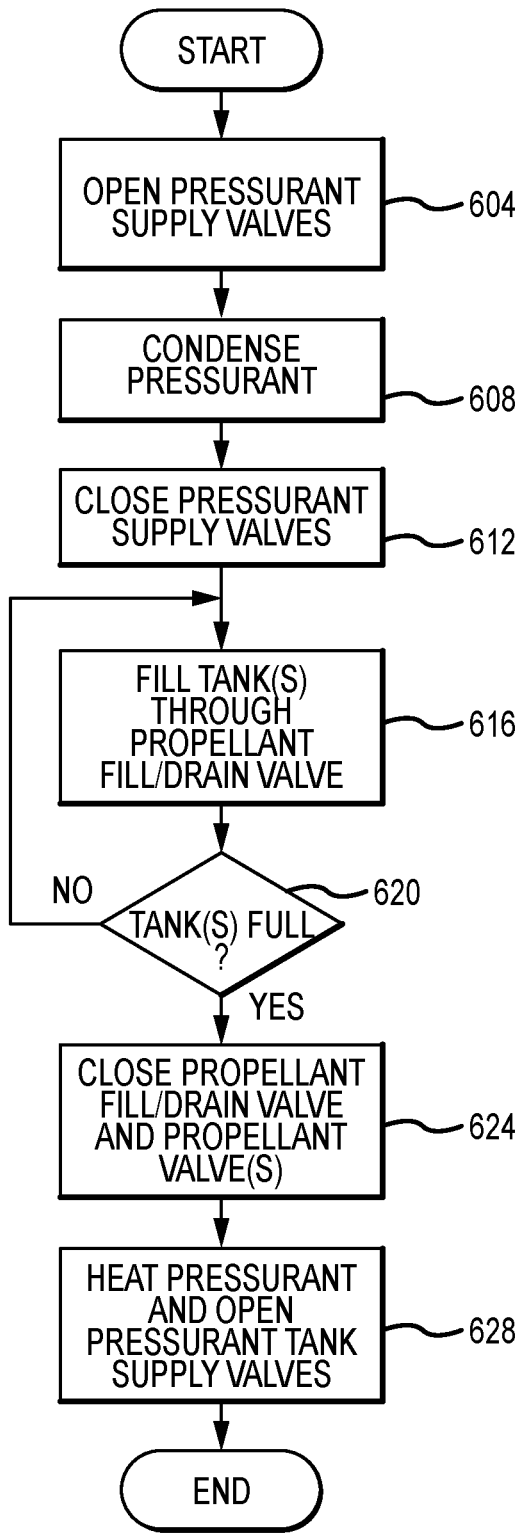
FIG. 6 is a flowchart depicting aspects of another process for refueling a chemical propellant thruster system in accordance with embodiments of the present disclosure.

FIG. 6 is a flowchart depicting aspects of a process for refueling a chemical propellant thruster system, for example a system 400 having multiple pressurant tanks 216 and 218 and multiple fuel tanks 208, in accordance with other embodiments of the present disclosure. The process can also be applied to systems having different combinations of components, for example systems 200 and 300, with modifications to account for those different components. In particular, this process can be performed when the system 200, 300 or 400 utilizes a condensable gas as a pressurant 212. Initially, at step 604, the pressurant supply valves 224 are opened. The pressurant 212 is then condensed into a liquid or solid by cooling the pressurant 212, thus reducing the pressure within the fuel tanks 204 (step 608). Next, the pressurant supply valves 224 are closed (step 612). The propellant valve 236 for each fuel tank 208 that is to be refueled and the propellant supply fill/drain valve 248 are then opened, and the depressurized fuel tank or tanks 208 are filled through the open propellant fill/drain valve 248 and propellant valves 236 (step 616). As an example, but without limitation, the fuel 204 can be provided by a servicer spacecraft. At step 620, a determination is made as to whether the fuel tank or tanks 208 are full. If no, the process returns to step 616. If yes, the propellant fill/drain valve 248 and the open propellant valves 236 are closed (step 624). As can be appreciated by one of skill in the art after consideration of the present disclosure, the process of filling fuel tanks 208 can be repeated, for example to add different chemicals to different fuel tanks 208. The refueled fuel tanks 208 are then repressurized by heating the pressurant 212, and opening one of the pressurant tank valves 220 or 222 and the pressurant supply valve or valves 224 for the fuel tank or tanks 208 to be repressurized (step 628). The process can then end.

As can be appreciated by one of skill in the art after consideration of the present disclosure, a monopropellant chemical thruster system using a condensable pressurant 212 can implement the above described process in connection with a system having a single pressurant tank 216 (e.g. as in system 300) or multiple pressurant tanks 216 and 218 (e.g. as in systems 200 and 400). In accordance with embodiments of the present disclosure, pressurant 212 for repressurizing the fuel tanks 204 can be supplied from the secondary pressurant tank 218 after the primary pressurant tank 216 has been depleted.

Although particular exemplary embodiments of monopropellant chemical thruster systems that facilitate refueling and/or load balancing have been described herein, embodiments of the present disclosure are not so limited. For instance, any number of fuel tanks 208 and pressurant tanks 216 and 218 can be incorporated into the system. In addition, the inclusion of one or more large capacity pressurant tanks or reservoirs 216 and/or 218 or multiple pressurant tanks or reservoirs 212 and 216 to facilitate refueling a propellant 204 at reduced pressures as described herein can be applied in connection with bipropellant propulsion systems, or any systems that utilize a consumable pressurized by a pressurant gas, in addition to monopropellant systems.

The foregoing description has been presented for purposes of illustration and description. Further, the description is not intended to limit the disclosed systems and methods to the forms disclosed herein. Consequently, variations and modifications commensurate with the above teachings, within the skill or knowledge of the relevant art, are within the scope of the present disclosure. The embodiments described hereinabove are further intended to explain the best mode presently known of practicing the disclosed systems and methods, and to enable others skilled in the art to utilize the disclosed systems and methods in such or in other embodiments and with various modifications required by the particular application or use. It is intended that the appended claims be construed to include alternative embodiments to the extent permitted by the prior art.

What is claimed is:

1. A method for refueling a chemical propellant thruster system of a spacecraft, comprising:
   opening a pressurant supply valve in communication with a fuel tank and with a pressurant tank, wherein the fuel tank is selectively in communication with a thruster of the chemical propellant thruster system, wherein at least the pressurant tank contains a pressurant, and wherein the pressurant is a condensable gas;
   depressurizing the fuel tank, wherein depressurizing the fuel tank includes condensing the pressurant;
   after condensing the pressurant, closing the pressurant supply valve;
   after closing the pressurant supply valve, opening a propellant fill/drain valve in communication with the fuel tank;
   adding propellant to the fuel tank through the open propellant fill/drain valve while the fuel tank is depressurized;
   after adding the propellant to the fuel tank, closing the propellant fill/drain valve; and
   after closing the propellant fill/drain valve and after adding propellant to the fuel tank, pressurizing the fuel tank by heating the pressurant and opening the closed pressurant supply valve.

2. The method of claim 1, further comprising:
   prior to adding the propellant to the fuel tank, closing a pressurant tank valve in communication with the pressurant tank.

3. The method of claim 2, wherein pressurizing the fuel tank includes:
   opening the pressurant tank valve to place a pressurant tank in communication with the fuel tank.

4. The method of claim 1, wherein pressurizing the fuel tank using the heated pressurant includes:
   opening at least one of a primary pressurant tank valve in communication with a primary pressurant tank or a secondary pressurant tank valve in communication with a secondary pressurant tank.

5. The method of claim 4, wherein releasing pressurant from the fuel tank further includes opening one of a plurality of pressurant supply valves, wherein the fuel tank is one of a plurality of fuel tanks, and wherein each fuel tank in the plurality of fuel tanks is associated with a corresponding one of the pressurant supply valves.

6. The method of claim 5, wherein, prior to adding propellant to the fuel tank, one of a plurality of propellant valves is opened, wherein each fuel tank in the plurality of fuel tanks is associated with a corresponding one of the propellant valves.

7. The method of claim 6, wherein a first one of the fuel tanks contains a chemical propellant, wherein a second one of the fuel tanks contains an oxidizer, and wherein the thruster system is a bipropellant thruster system.

8. The method of claim 1, wherein the propellant is a monopropellant.

9. The method of claim 1, wherein the pressurant contained in the pressurant tank is a condensable gas.

10. A method for refueling a chemical propellant thruster system of a deployed spacecraft, comprising:
    providing a pressurant to pressurize fuel contained in a plurality of fuel tanks, wherein each fuel tank in the plurality of fuel tanks is selectively in communication with a thruster of the chemical propellant thruster system;
    opening a pressurant supply valve for each fuel tank in the plurality of the fuel tanks selected to be refueled;
    condensing the pressurant into a liquid or a solid by cooling the pressurant, depressurizing each fuel tank to be refueled;
    closing the previously opened pressurant supply valve or valves;
    opening a propellant valve for each of the fuel tanks selected to be refueled and opening a propellant fill/drain valve;
    adding propellant to the fuel tanks selected to be refueled through the open propellant valve or valves and the open propellant fill/drain valve;
    after adding the propellant to the selected fuel tanks, closing the previously opened propellant valve or valves and closing the propellant fill/drain valve; and
    after closing the propellant valve or valves and closing the propellant fill/drain valve, repressurizing the selected fuel tanks by heating the pressurant and by opening the pressurant supply valve for each of the selected fuel tanks.

11. The method of claim 10, wherein the propellant is a monopropellant.

12. The method of claim 10, wherein a first one of the fuel tanks contains a chemical propellant, wherein a second one of the fuel tanks contains an oxidizer, and wherein the thruster system is a bipropellant thruster system.

13. The method of claim 10, wherein at least some of the pressurant is contained in a pressurant tank and is a condensable gas.

* * * * *